United States Patent [19]

Horn

[11] Patent Number: 5,172,055
[45] Date of Patent: Dec. 15, 1992

[54] HIDDEN METAL EDGE MAPPER UTILIZING EDDY CURRENT ANALYZER AND SPRING BIASED MARKER

[75] Inventor: Michael Horn, South Setauket, N.Y.

[73] Assignee: Grumman Aerospace Corporation, Bethpage, N.Y.

[21] Appl. No.: 778,356

[22] Filed: Oct. 17, 1991

[51] Int. Cl.⁵ ............... G01N 27/72; G01N 27/90
[52] U.S. Cl. ............... 324/207.16; 324/207.22; 324/207.24; 324/226; 324/262
[58] Field of Search ............... 324/67, 207.15, 207.16, 324/207.17, 207.22, 207.24, 226-232, 234, 236-239, 262, 326-329

[56] References Cited

U.S. PATENT DOCUMENTS

| | | |
|---|---|---|
| 1,971,189 | 8/1934 | Leibing ............... 324/67 |
| 2,129,058 | 9/1938 | Hedden ............... 324/329 X |
| 2,167,490 | 7/1939 | Ryan . |
| 2,346,773 | 4/1944 | McBride et al. . |
| 2,600,857 | 6/1952 | De La Mater . |
| 2,844,977 | 7/1958 | Morse . |
| 2,862,178 | 11/1958 | Moore . |
| 3,201,562 | 8/1965 | Anderson . |
| 3,271,664 | 9/1966 | Mountz et al. . |
| 3,435,335 | 3/1969 | Blitchington, Jr. . |
| 3,526,829 | 9/1970 | Noble ............... 324/238 |
| 3,907,136 | 9/1975 | Christides et al. . |
| 4,042,876 | 8/1977 | Visioli, Jr. . |
| 4,091,322 | 5/1978 | Stankoff . |
| 4,412,177 | 10/1983 | Petrini et al. . |
| 4,553,095 | 11/1985 | Schenk, Jr. et al. . |

*Primary Examiner*—Gerard R. Strecker
*Attorney, Agent, or Firm*—Pollock, VandeSande & Priddy

[57] ABSTRACT

An eddy current analyzer is employed to locate and map a substrate edge hidden from view by a cover plate. A probe has an axial bore in which rests a spring-biased marker. The analyzer scope traces locate hidden points along the edge and the marker maps these along the cover plate. A line drawn between the points locates the edge thereby enabling holes to be drilled at equal distances from the hidden edge.

1 Claim, 1 Drawing Sheet

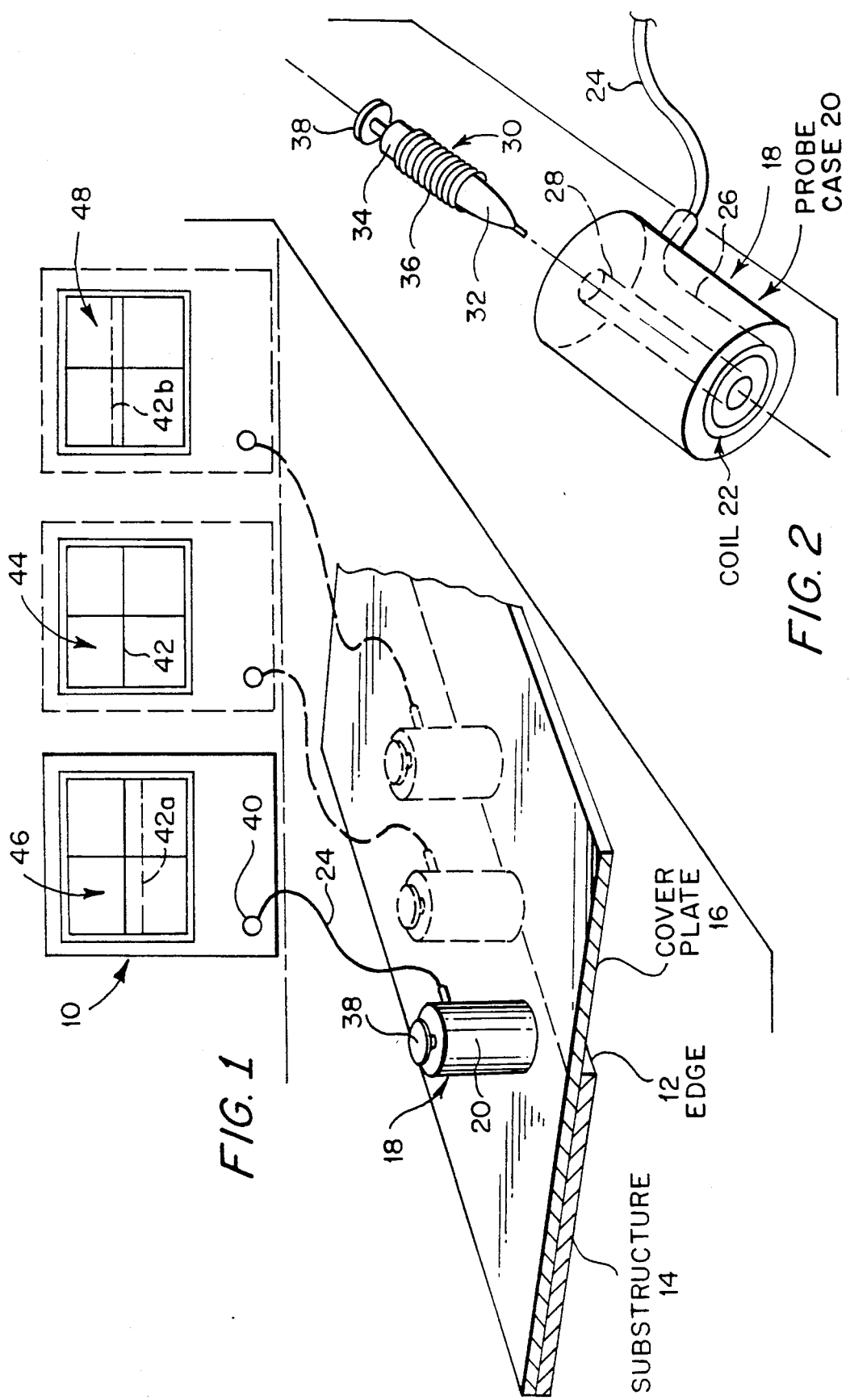

HIDDEN METAL EDGE MAPPER UTILIZING EDDY CURRENT ANALYZER AND SPRING BIASED MARKER

FIELD OF THE INVENTION

The present invention relates to eddy current detectors and analyzers and more particularly to a novel probe therefor.

BACKGROUND OF THE INVENTION

Eddy current analyzers have long been used for measuring metal thickness. Earlier examples of such apparatus are disclosed in U.S. Pat. Nos. 2,862,178 to Moore (Nov. 25, 1958) and 4,553,095 to Schenk, et al. (Nov. 12, 1985). In eddy current analyzers, a probe is included which has a coil embedded therein. The coil becomes energized so as to create a magnetic field which permeates a metal structure contacted by the probe. The magnetic field induces eddy currents in an article undergoing test. The impedance reflected from the tested article de-tunes the coil in the probe and this is capable of being measured by the analyzer. Typically, eddy current analyzers are employed to gauge the thickness of a metal object by calibrating the analyzer with a known standard object having a reference thickness.

In many applications, such as in the aerospace industry, it is often necessary to drill holes in a cover plate which is to be secured to a substructure. However, in order to ensure that fastener holes will not be drilled too close to the edge of the substructure, a number of techniques are employed to draw a line on the cover plate indicating where the underlying substructure edge is located. These techniques often fall prey to inaccuracies when a line is to be drawn on a cover plate resting against a substructure hidden from view. Predrawn lines on the cover plate also present difficulties since they do not often match the actual location of an underlying substructure edge. Thus, holes may be drilled through the cover plate and substructure at points too close to the edge of the substructure. The result is a lack of structural integrity which could cause failure of an assembled structure. Accordingly, it would be highly desirable to perfect a means for detecting the actual location of a substructure edge so that it could be realistically and accurately marked on a cover plate thereby guiding the drilling operation for holes through the cover plate and substructure. Since an eddy current analyzer is capable of measuring metal materials in a non-destructive fashion, it would be of great advantage to adapt current eddy current analyzers for locating substructure edges so that the edge might be mapped on a cover plate.

BRIEF DESCRIPTION OF THE PRESENT INVENTION

The present invention adapts a conventional eddy current analyzer with a probe particularly suited to mark detected step increases in thickness below a cover plate such as occurs at the edge of a substructure. The probe is an adaptation of existing types but with a center bore formed therethrough to allow the seating of a coaxially positioned marker. The marker is spring-biased so that it normally rests away from the probe end which is in contact with a cover plate surface.

By moving the probe along the cover plate, points will be detected where an underlying substructure edge exists. The marker may then be manually depressed to make a point mark. This process is repeated until a number of points along an underlying substructure are located and marked. Then, a line is drawn between the individual points thereby mapping the location of the substructure edge under the cover plate.

The scope display of a conventional eddy current analyzer is initialized by moving the probe of the present invention over a reference cover plate to a point immediately above a reference substructure edge. Later, scope traces of actual structures having the same thicknesses as the references are observed carefully until one obtains a trace identical to that when the standard structures were observed as the substructure edge. This provides a unique identification of an underlying substructure edge during actual utilization of the analyzer and inventive probe.

BRIEF DESCRIPTION OF THE FIGURES

The above-mentioned objects and advantages of the present invention will be more clearly understood when considered in conjunction with the accompanying drawings, in which:

FIG. 1 is a perspective view of a set up in which the invention is used;

FIG. 2 is a perspective disassembled view of an inventive probe.

DETAILED DESCRIPTION OF THE INVENTION

In FIG. 1 a conventional eddy current analyzer 10 is indicated. For the present invention tests were made on an analyzer manufactured by the NORTEC Corporation of Washington State and denoted as Model NDT-16. For the present invention, the customary probe for such an analyzer has been replaced by a modified version generally indicated by reference numeral 18. The probe is seen to be located on a cover plate 16 which obscures a lower positioned substructure 14. As previously discussed, the purpose of the present invention is to locate the hidden edge 12 of the substructure thereby allowing it to be marked on the cover plate, as will be explained hereinafter. In FIG. 1 scope traces corresponding to different probe positions relative to the substructure edge are indicated and will be discussed hereinafter.

FIG. 2 illustrates the construction of the modified probe 18 which is seen to include a generally cylindrical probe case 20 having an eddy current coil 22 coaxially imbedded therein. A cable 24 is connected between terminal 40 of the analyzer 10 and probe 18. The cable includes conductors 26 which conduct low frequency oscillating currents from the analyzer 10 to the coil 22. Typically, the excitation frequency is in the range of 200 Hz.

A modification of the typical probe includes a central bore 28 axially extending through the length of the probe 18. A generally cylindrical marker 34 is positioned in the bore 28. A spring 36 is located along the exterior surface of the marker 34 and is designed to have a diameter slightly larger than that of the bore so that the marker point 32 is biased in non-contacting relationship with a surface upon which the probe 18 rests. The marker has a head 38 that allows depression of the marker as required to map the edge 12 of a substructure 14, as will now be explained.

Referring once again to FIG. 1, the analyzer may be calibrated by positioning the probe 18 over the substructure edge of a small cover plate-substructure reference assembly wherein the edge is easily and precisely premarked on the cover plate. The analyzer 10 is then calibrated or adjusted so that the display 44 displays a scope trace such as 42 in exact alignment with the X axis quadrature scope line.

After initial calibration, the scope trace on an analyzer will show the same coincidence with the X axis quadrature line when the probe becomes moved to a point on an actual inspected cover plate-substructure, having identical thicknesses as the reference structures, wherein the probe has been positioned immediately over the edge 12. The marker head 38 may then be depressed to mark the point on the cover plate 16.

FIG. 1 further illustrates a second display 46 of the analyzer 10 wherein the probe 18 has been slightly moved to a position to the left of the edge 12. The display 46 illustrates a scope trace 42a which is vertically offset from the X axis quadrature line of the analyzer scope. A third position for probe 18 is indicated and shows a display 48 wherein a scope trace 42b is shown. In this position the scope trace indicates that the probe is on an opposite side of the edge 12, relative to that of the just-discussed second position (display 46) and the probe is closer to edge 12 than it was in the second position (display 46). Thus, the method and apparatus of the present invention enable an individual performing testing to visually detect when the probe is positioned near a hidden substructure edge 12 and provides a sense of distance and position relative to the edge when the probe approaches the edge.

In actual utilization of the present invention, an individual testing a cover plate-substructure employs the probe to locate a number of points along the cover plate which coincide with the edge 12. Each time such a point is precisely located, the marker 30 is employed to mark such a point. After a number of such points are located, a line may be drawn connecting the points thereby mapping the edge 12 on the cover plate. With the edge so marked, it now becomes possible to accurately drill holes relative to the edge with precise and repeatable tolerance.

It should be understood that the invention is not limited to the exact details of construction shown and described herein for obvious modifications will occur to persons skilled in the art.

I claim:

1. A method for locating the hidden edge of a substructure covered by a plate, the method comprising the steps:

moving an energized eddy current coil along the cover plate surface;

detecting a predetermined reflected impedance in the coil as it moves over the substructure edge;

depressing a spring-biased marker concentrically located in the coil to mark the underlying point of the substructure edge on the cover plate;

repeating the marking step at various points along the edge; and connecting the marked points on the cover plate to define the underlying location of the substructure edge.

* * * * *